Oct. 9, 1934.  J. KOBARYNKA ET AL  1,975,955
CONVERTIBLE FREIGHT CAR
Filed May 29, 1933  2 Sheets-Sheet 2
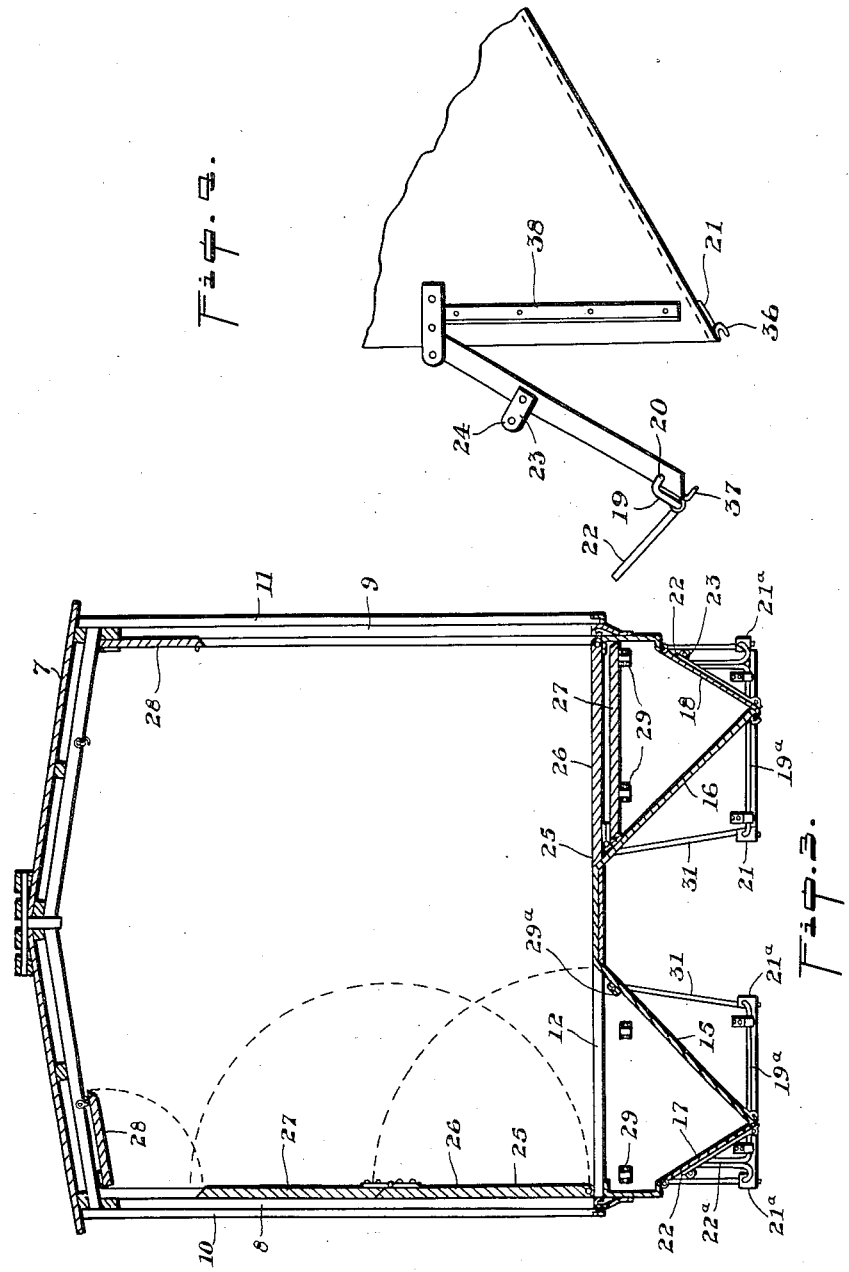
INVENTORS.
JOHN KOBARYNKA.
FEDOR TATARCHUK.
BY Gordon Gowling
ATTORNEY.

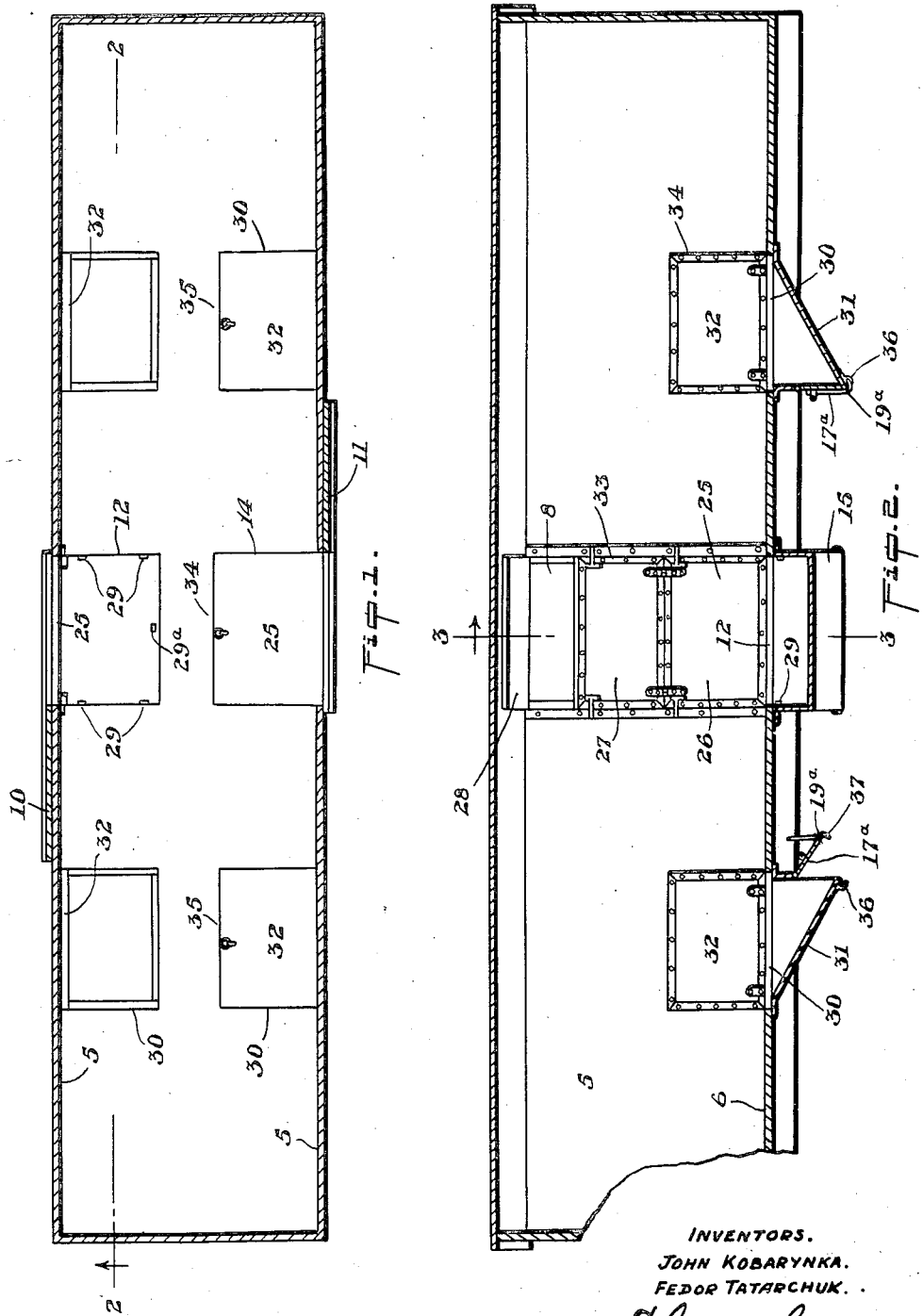

Patented Oct. 9, 1934

1,975,955

UNITED STATES PATENT OFFICE 1,975,955

CONVERTIBLE FREIGHT CAR

John Kobarynka and Fedor Tatarchuk, Transcona, Manitoba, Canada

Application May 29, 1933, Serial No. 673,440
In Canada July 4, 1932

2 Claims. (Cl. 105—243)

Our invention relates to a convertible freight car and has for its principal object the provision of means whereby a freight car may be converted into a grain conveying car or may be converted into an ordinary box car, in both instances the freight car embodying the features desirable in a grain conveyance car or ordinary box car.

A further object of our invention is the provision of a convertible freight car embodying means whereby, grain or other granular commodities may be conveniently loaded and unloaded with a minimum of labour and with the utmost facility.

A further object of our invention is the provision of a freight car which may be converted into either a grain car or an ordinary box car, the operative parts of the freight car being of sturdy construction and positive in operation.

A further object of our invention is the provision of a freight car as above set forth, embodying a plurality of discharge hoppers having discharge doors and securing means which may be sealed or locked into position.

A further object of our invention is the provision of a freight car as set forth embodying discharge hoppers and co-operating doors adapted to close the usual loading openings in the freight car, which doors are adapted to be utilized to cover the said hoppers and act as floor area thereover, when the freight car is used for ordinary freight other than grain or like granular commodities.

With the foregoing and other objects in view, as will appear as the description proceeds, our invention consists of the novel construction, combination and arrangement of co-operating elements as hereinafter more specifically set forth, claimed and shown in the accompanying drawings forming a part of the present application, in which:—

Figure 1 is a plan sectional view of a freight car, disclosing the preferred embodiment of our invention.

Figure 2 is a sectional view of a freight car, disclosing the preferred embodiment of our invention as taken on the line 2—2 of Figure 1.

Figure 3 is a sectional view of a freight car, disclsoing the preferred embodiment of our invention as taken on the line 3—3 of Figure 2.

Figure 4 is a sectional view, illustrating the preferred means of locking the hopper discharge doors.

Like numerals of reference designate corresponding parts throughout the different views.

5 illustrates the side walls, 6 the floor and 7 the roof of our freight car. 8 and 9 are the usual entrance or loading openings in the side walls of the freight car through which freight or other commodities are loaded into the freight car. 10 and 11 are suitable sliding doors adapted to cover the openings 8 and 9 on the exterior of the side walls 5. 12 and 14 are openings formed through the floor 6 opposite each of the loading openings 8 and 9, respectively.

15 and 16 are hoppers supported below the openings 12 and 14, respectively. 17 and 18 are trap doors adapted to be swung to provide a discharge opening at the lower end of each of the hoppers 15 and 16, respectively. Each of the trap doors 17 and 18 is provided with a locking bar 19 pivotally supported on the lower end thereof. The opposite ends of the locking bars 19 are shaped in the form of hooks 20, which are adapted to engage through the cleats 21 supported at opposite sides of the hoppers 15 and 16. Each of the locking bars 19 is provided with an operating lever 22 by which the locking bars 19 may be pivoted to engage or disengage the hooked ends 20 with or from the cleats 21. Supported on each of the trap doors 17 and 18 is a cleat 23, having an aperture 24 formed therein through which a suitable locking pin may be inserted to retain the operating levers 22 in closed or locked position after the hooked ends 20 have been engaged with the cleats 21. The securing pins may be sealed in any desired manner when a commodity is in the freight car.

Hingedly mounted to the frame of the freight car, adjacent the outer side of each of the openings 12, we provide a closure door 25 comprised of the hingedly connected portions 26 and 27. 28 are flap doors hingedly supported adjacent the upper end of each of the openings 8 and 9, respectively. The doors 25 are adapted to be swung upwardly into position to close the greater area of the openings 8 and 9, respectively, as disclosed at the left side of Figure 3. The flap doors 28 are adapted to be swung downwardly to close the remaining area of the openings 8 and 9, respectively. The doors 25 may have their portions 27 folded downwardly upon the portions 26 and then these two portions swung downwardly as a unit over the openings 12 and 14, respectively, as disclosed at the right side of Figure 3, to completely close said openings. When the doors 25 are in this position the portions 27 are supported on cleats 29, which are carried on the sides of the hoppers. Similar cleats 29a may be provided to support the free end of the portion 26 flush with the floor surface of the freight car.

30 are openings formed in the floor 6 adjacent the side walls 5 and intermediate the opposite ends of the freight car and the openings 12 and 14. 31 are hoppers supported below the openings 30. 17a are trap doors hingedly connected to each of the hoppers 31 and adapted to close the discharge end thereof. Each of the trap doors 17a is provided with a locking bar 19a similar to the locking bars 19 on the trap doors 17 and 18 on the hoppers 15 and 16, respectively. The locking bars 19a may be secured and sealed in a similar manner to that described in connection with the locking bars 19. Hingedly supported adjacent the outer end of each of the openings 30 is a trap door 32, which trap doors are adapted to be lowered flush with the floor 6 to close their respective openings 30.

The outer periphery of each of the doors 25 and 32, respectively, is preferably provided with metallic bindings 33 and 34, respectively. The doors 25 and 32 may be reinforced in any desired manner such as by angle iron ribs or the like. The doors 25 and 32 are provided with suitable countersunk rings 34 and 35, respectively, to facilitate raising of the same.

The lower edges 36 of each of the hoppers 15, 16 and 31, respectively, are turned back upon themselves and then bent forwardly to provide a groove. The free edge 37 of each of the trap doors 17, 18 and 17a, respectively, is bent inwardly to form a leaf which is adapted to register in the groove formed in the lower edges 36 of the hoppers. This will provide a joining between the free edge of the trap doors and their respective hoppers which will prevent any grain or the like from escaping therefrom. If desired, the opposite vertical edges of the respective hoppers and trap doors may be formed in a similar manner. Preferably, we provide reinforcing means such as the angle irons 38 to retain the opposite sides of the hoppers rigid.

When it is desirous of loading our freight car with grain or other granular commodities, the trap doors 17, 18 and 17a are securely locked in closed position. The trap doors 32 are raised to uncover the openings 30 and may be secured to the side walls 5 of the freight car in any desired manner. The closure doors 25 are swung to position, as disclosed at the left side of Figure 3, and secured in any desired manner. The flap doors 28 are secured in opened position, as disclosed at the left side of Figure 3. The grain or other granular commodity is loaded into the freight car through the openings 8 and 9 above the openings 27 of the doors 25. The granular commodity fills up the hoppers 15, 16 and 31 and the body portion of the car to the desired capacity, after which the flap door 28 will be swung to closed position and secured in any desired manner.

When it is desired to unload the car, the trap doors 17, 18 and 17a may be opened and the granular commodity will flow out through the hoppers, 15, 16 and 31.

When it is desirous of using our freight car as a means for transporting other freight commodities, the doors 25 may be folded and lowered into position, as disclosed at the right side of Figure 3, to close the openings 12 and 14. The trap door 32 may be lowered to close the openings 30. When the respective trap doors 25 and 32 are thus lowered, the upper faces of the same will be in a flush plane with the floor 6 and will not obstruct the moving of freight during loading of the car. The flap door 28 will be swung upwardly and secured adjacent the roof of the car in any desired manner. The sliding doors 10 and 11 will provide closure members for the openings 8 and 9.

The foregoing specification and annexed drawings disclose the preferred embodiment of our invention, but it is to be understood that minor changes may be resorted to in the commercial adaptation of our invention without departing from the scope of the invention as hereinafter claimed.

What we claim as new is:

1. A convertible freight car having a side wall thereof formed with a loading opening, the floor of the car having a discharge opening formed therein adjacent the opening in the side wall, a closure for either the opening in the side wall or the discharge opening in the floor, said closure being formed of hingedly connected portions adapted to be folded in stacked position, one of said sections being of a size to fit within and close the discharge opening in the floor and being pivoted at one side at a point below the upper surface of the car floor and between the discharge opening in the floor and the opening in the side wall of the car, another section being pivoted to the side of said first mentioned section which is opposite the first mentioned pivot, said second section being of a size to pass through the discharge opening in the floor, whereby said second section may be folded onto the first section and the two sections swung to a position in which the first section closes the discharge opening in the floor and the second section lies below said discharge opening, and means beneath said discharge opening for supporting said stack sections.

2. A convertible freight car having a side wall thereof formed with a loading opening, the floor of the car having a discharge opening formed therein adjacent the opening in the side wall, a discharge hopper positioned beneath said discharge opening, a closure for either the opening in the side wall or the discharge opening in the floor, said closure being formed of hingedly connected portions adapted to be folded in stacked position, one of said sections being of a size to fit within and close the discharge opening in the floor and being pivoted at one side between the discharge opening in the floor and the opening in the side wall of the car and pivoted so as to be capable of being swung into a position such that it lies substantially flush with the floor of the car, another section being pivoted to the side of said first mentioned section which is opposite the first mentioned pivot, said second section being of a size to pass through the discharge opening in the floor when said sections are folded one against another and the first mentioned section is swung to lie flush with the floor of the car, means carried by the hopper for supporting said stacked sections, and a supplemental closure for the opening in the side wall of the car, said supplemental closure being pivoted adjacent the roof of the car and adapted to be swung downwardly to cooperate with the aforementioned closure to form a complete closure for the opening in the side wall.

JOHN KOBARYNKA.
FEDOR TATARCHUK.